UNITED STATES PATENT OFFICE.

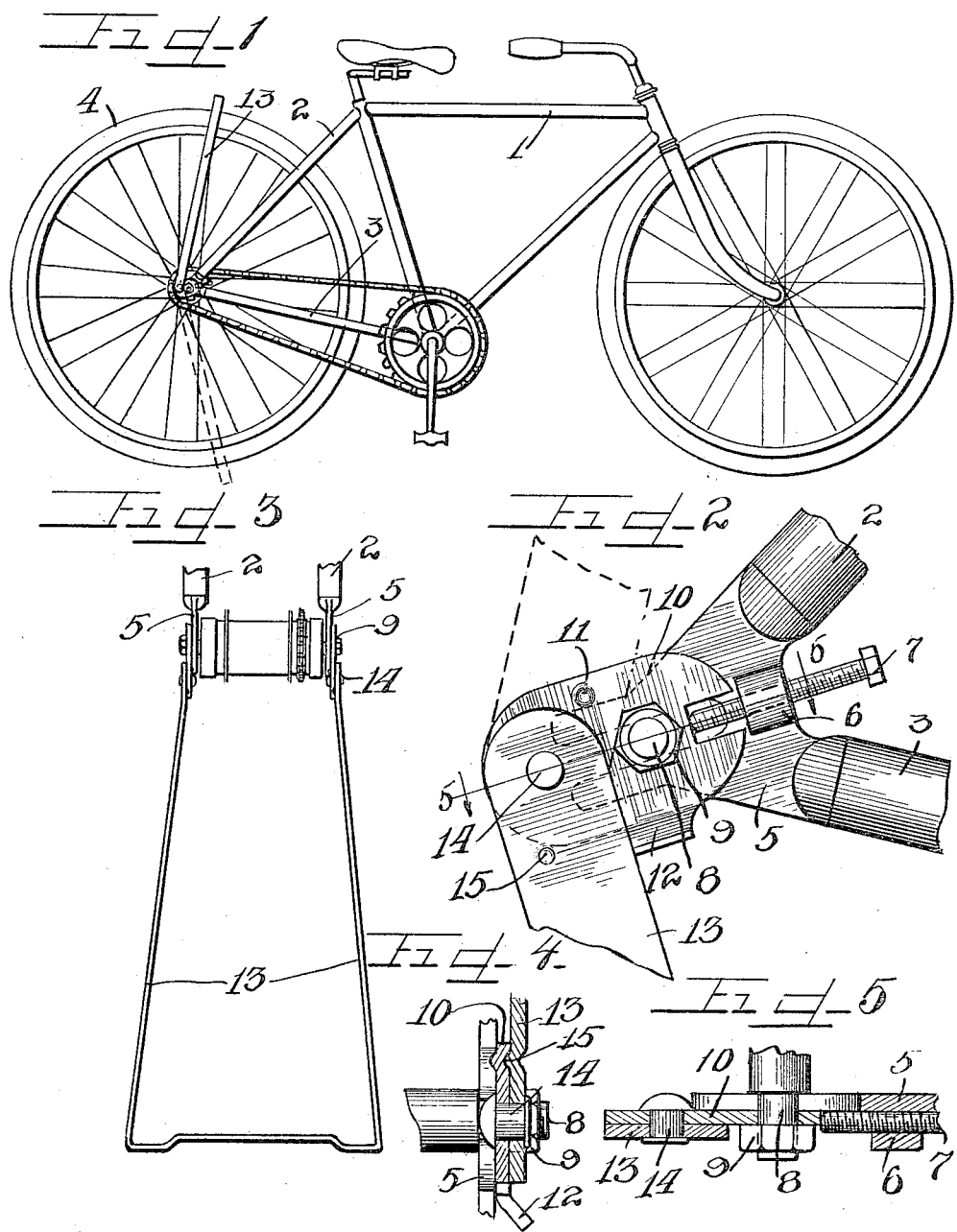

WALTER R. GREEN, OF CHICAGO, ILLINOIS.

BICYCLE-STAND.

1,127,431.   Specification of Letters Patent.   Patented Feb. 9, 1915.

Application filed July 2, 1913.   Serial No. 776,900.

*To all whom it may concern:*

Be it known that I, WALTER R. GREEN, a citizen of the United States, and a resident of the city of Chicago, in the county of Cook and State of Illinois, have invented certain new and useful Improvements in Bicycle-Stands; and I do hereby declare that the following is a full, clear, and exact description of the same, reference being had to the accompanying drawings, and to the numerals of reference marked thereon, which form a part of this specification.

Bicycle stands have been used extensively on motor-cycles in order to support the rear wheel thereof elevated from the ground when at rest. Such stands have usually been secured out of contact with the ground when not in use by a spring latch secured on the mud guard of the motor-cycle, thereby supporting the stand in substantially a horizontal position when not in use.

This invention relates to a bicycle stand capable of being readily attached to an ordinary type of bicycle, although the same may be adapted to a motorcycle.

It is an object of this invention to construct a bicycle stand wherein the attaching means therefor to the bicycle may take the place of the usual traveling support for the axle of the rear wheel.

It is also an object of this invention to provide a supporting stand for a bicycle associated with a traveling or adjustable axle support, said stand and support having complemental detents therein adapted to engage and retain said stand in position when out of use.

It is also an object of this invention to provide a bicycle supporting stand capable of association with a bicycle to displace the ordinary adjustable axle support and provided with spring latching means for automatically and releasably locking the stand in position when not in use.

It is furthermore an object of this invention to provide a bicycle stand, the supporting arms of which are disposed in a direction when not in use to assist the latching means in retaining the same in such position, and at the same time conveniently arranged to permit unlatching of the same when desired to elevate the rear wheel.

It is furthermore an object of this invention to provide a device adapted to be secured on the axle of the rear wheel of a bicycle and affording positive adjusting means therefor, and also providing a stop to bear against the supporting legs of the stand to hold the rear wheel of the bicycle elevated.

It is finally an object of this invention to provide a simple, cheap and durable device capable of ready attachment to a bicycle by persons not having previous experience.

The invention (in a preferred form) is illustrated in the drawings, and hereinafter more fully described.

In the drawings: Figure 1 is a conventional view of a bicycle showing a device embodying my invention attached thereto. Fig. 2 is an enlarged fragmentary detail illustrating the connection of the bicycle stand to the rear axle and frame of the bicycle. Fig. 3 is a fragmentary end elevation with the wheel removed, and showing the association of the bicycle stand, the hub and the frame of the wheel. Fig. 4 is an enlarged detail partly in section showing the supporting legs in latched position and out of use. Fig. 5 is a fragmentary enlarged detail partly in section taken on line 5—5 of Fig. 2.

As shown in the drawings: A bicycle 1, is provided as usual with rear forks 2, and 3, respectively, affording attaching means for a rear wheel 4. The fork members 2, and 3, are joined at their ends on each side of said wheel by slotted web members 5, integral with which and extending outwardly therefrom is an apertured threaded lug 6, for the adjusting bolts 7. An axle bolt 8, of the rear wheel 4, is engaged in the slots in the web members 5, and engaged over the ends of said axle bolt 8, and secured thereon by the nuts 9, are adjusting plates 10. Each of said traveling axle plates 10, is provided with an indent 11, and the downwardly extending lugs 12. An integral bracket member having the legs 13, is pivotally mounted by means of rivets 14, or any other means, upon the rear end of the plates 10, and each of said legs 13, at a point not far from the rivets 14, is provided with the detents 15, adapted when the bracket stand is in its upper position out of use to engage within the detent 11, to hold the bracket in such position.

The operation is as follows: In order to attach the bicycle stand to a bicycle, the usual traveling plates are removed, or upon a type of bicycle not provided with the same, the nuts 9, on the axle of the rear wheel are removed and the plates 10, inserted thereover, and the nuts 9, replaced. As shown, the pivoted leg members 13, may swing inwardly and slightly forwardly of the rear wheel beyond the center thereof, and bearing against the lugs 12, elevate and cradle the rear portion of the bicycle frame thereon.

When it is desired to throw the bicycle stand out of use, the bicycle is moved forwardly, whereupon the base of the bicycle stand holding its position, the stand will be moved rearwardly relative the bicycle, and the rear wheel will be dropped down upon the ground. The bracket is then swung upwardly about its pivot 14, until the indent and detent 11 and 15, respectively are engaged to hold the same in position, such a position being indicated in dotted lines in Fig. 2. By proper adjustment of the nuts 9, upon the axle, the nuts may be used as a stop for the legs 13, when the same are swung upwardly out of use, as shown in dotted lines in Fig. 2.

I am aware that details of construction may be varied through a wide range without departing from the principles of this invention. I therefore do not purpose limiting the patent granted otherwise than necessitated by the prior art.

I claim as my invention:

1. In a device of the class described plates adapted to be engaged on the axle of a bicycle and having a slot in one end thereof engaging the adjusting bolts on the bicycle frame, and a bracket stand pivoted on said plates adapted to be moved into and out of operating position.

2. A device of the class described comprising apertured plates to be engaged on the axle of a bicycle and having a slot in one end thereof engaging the adjusting bolts on the bicycle frame, integral downwardly extending lugs on said plates, and a bracket pivoted to said plates and adapted to bear against said lugs when in operating position.

3. In a device of the class described supporting means adjustably connected to a bicycle frame to move relative thereto with the axle thereof, one end of said means slotted to engage the adjusting bolt on the bicycle frame, a bracket pivoted on said means affording an elevated support for the frame when in position, and resiliently engaging means adapted to retain said bracket in position out of use.

4. In a device of the class described the combination with traveling axle plates, each having a slot in one end thereof, of an axle bolt and adjusting bolts, one of said plates mounted on each of the ends of said axle bolt and controlled in its movement by an adjusting bolt engaging in the slot in the plate, and a stand pivoted on said plates.

5. In a device of the class described the combination with supporting plates and adjusting bolts, of an axle bolt, and a bracket stand pivoted to and adjustable together with said supporting plates on a bicycle frame by means of said adjusting bolts, said supporting plates held in position by said axle bolt and adapted to move relative the frame without relative movement between the axle bolt and the supporting plates.

6. In a bicycle stand of the class described slotted traveling axle plates, latching means thereon, the bicycle adjusting bolts engaging in the slots in the traveling axle plates, and a bracket stand pivoted on said axle plates, said traveling axle plates having the axle bolt of the bicycle extending therethrough and movable therewith relative the frame without relative movement between the axle bolt and the traveling axle plates.

7. In a device of the class described the combination of a bicycle, a stand, adjusting bolts on the bicycle, plates pivotally supporting said stand, an axle bolt of the bicycle extending through said plates and movable therewith, and nuts on said axle bolt, said plates rigidly secured on said axle bolt by said nuts, and having slots therein adapted to be engaged by said adjusting bolts.

8. In a bicycle stand of the class described traveling axle plates rigidly secured to and adjustable with the axle bolt on the bicycle frame, the bicycle adjusting bolts, each of said traveling axle plates having a slot engaged by one of said adjusting bolts, a bracket stand pivotally connected to said traveling axle plates, and lugs on said plates to brace said bracket stand in a supporting position.

9. A device in combination with a bicycle comprising traveling axle plates, the bicycle axle bolt extending therethrough and movable therewith, nuts thereon, a bracket stand pivoted on said plates eccentric with respect to said axle bolt and adapted to be supported in position out of use by said nuts on said axle bolt, and latching means on said plates and bracket stand respectively, to retain said bracket stand in said position out of use.

In testimony whereof I have hereunto subscribed my name in the presence of two subscribing witnesses.

WALTER R. GREEN.

Witnesses:
CHARLES W. HILLS, Jr.
LEON M. REIBSTEIN.